United States Patent
Downing et al.

(10) Patent No.: US 9,907,365 B2
(45) Date of Patent: Mar. 6, 2018

(54) METHOD OF PROVIDING DECORATIVE DESIGNS AND STRUCTURAL FEATURES ON AN ARTICLE OF FOOTWEAR

(71) Applicant: New Balance Athletic Shoe, Inc., Boston, MA (US)

(72) Inventors: Tim Downing, Boston, MA (US); Troy Schubert, Groveland, MA (US); Drew Spieth, Cambridge, MA (US); Thomas Ceurvals, Somerville, MA (US); Adan Wang, Guangzhou (CN); Kingsly Rao, Dongguan (CN)

(73) Assignee: New Balance Athletics, Inc., Boston, MA (US)

( * ) Notice: Subject to any disclaimer, the term of this patent is extended or adjusted under 35 U.S.C. 154(b) by 401 days.

(21) Appl. No.: 14/538,343

(22) Filed: Nov. 11, 2014

(65) Prior Publication Data
US 2016/0128433 A1  May 12, 2016

(51) Int. Cl.
*A43D 95/14* (2006.01)
*A43D 8/16* (2006.01)
*A43B 23/24* (2006.01)
*B23K 26/38* (2014.01)
*B23K 26/382* (2014.01)
*A43B 3/00* (2006.01)
(Continued)

(52) U.S. Cl.
CPC ............ *A43D 95/14* (2013.01); *A43B 3/0078* (2013.01); *A43B 23/24* (2013.01); *A43D 8/16* (2013.01); *A43D 8/22* (2013.01); *A43D 8/28* (2013.01); *B23K 26/38* (2013.01); *B23K 26/382* (2015.10)

(58) Field of Classification Search
CPC .................................................... A43B 3/0078
See application file for complete search history.

(56) References Cited

U.S. PATENT DOCUMENTS 4,547,649 A   10/1985   Butt et al.
4,769,257 A    9/1988   Duley et al.
(Continued)

FOREIGN PATENT DOCUMENTS

CN   101574182 A   11/2009
DE     3425263 A1   1/1985
(Continued)

OTHER PUBLICATIONS

Kan, Undefeated X Nike Sportswear Air Force 1 Supreme Low "Livestrong", Nov. 12, 2009, http://hypebeast.com/2009/11/eddie-cruz-nike-sportswear-air-force-1-supreme-livestrong.
(Continued)

*Primary Examiner* — Benjamin A Schiffman
(74) *Attorney, Agent, or Firm* — Goodwin Procter LLP

(57) ABSTRACT

The invention relates to footwear and portions thereof having structural features and decorative designs thereon, and related systems and methods for manufacturing same. An example method for providing a feature on a surface of an object includes positioning a laser proximate the surface of the object, directing a laser beam from the laser to the surface of the object to mark or engrave at least a portion of the surface of the object, and moving at least one of the laser or the object to create a pattern on the surface of the object, the pattern providing at least one of an aesthetic or a structural feature on the surface of the object.

19 Claims, 9 Drawing Sheets

(51) Int. Cl.
*A43D 8/22* (2006.01)
*A43D 8/28* (2006.01)

(56) References Cited

U.S. PATENT DOCUMENTS

| | | | |
|---|---|---|---|
| 4,822,973 A | | 4/1989 | Fahner et al. |
| 4,933,205 A | | 6/1990 | Duley et al. |
| 4,979,317 A | | 12/1990 | Fukuoka |
| 5,470,904 A | * | 11/1995 | Loftin .................... C09D 11/16 106/31.72 |
| 5,523,125 A | * | 6/1996 | Kennedy ................ A63B 45/02 427/155 |
| 6,627,299 B1 | | 9/2003 | Feng et al. |
| 6,966,128 B2 | | 11/2005 | McClaskie |
| 6,976,320 B2 | | 12/2005 | McClaskie |
| 7,065,820 B2 | | 6/2006 | Meschter |
| 7,140,129 B2 | | 11/2006 | Newson et al. |
| 7,707,748 B2 | | 5/2010 | Campbell |
| 8,008,599 B2 | | 8/2011 | Meschter |
| 8,172,970 B2 | | 5/2012 | Sussmann |
| 8,303,885 B2 | | 11/2012 | Hatfield et al. |
| 8,333,021 B2 | | 12/2012 | Johnson |
| 8,479,416 B2 | | 7/2013 | Auger et al. |
| 8,661,712 B2 | | 3/2014 | Aveni et al. |
| 8,661,717 B2 | | 3/2014 | Miner |
| 8,689,467 B2 | | 4/2014 | Miner |
| 8,732,986 B2 | | 5/2014 | Miner |
| 2005/0191436 A1 | | 9/2005 | Van Orman et al. |
| 2008/0307631 A1 | * | 12/2008 | Lin .......................... B44C 1/228 29/527.4 |
| 2010/0122476 A1 | | 5/2010 | Le et al. |
| 2011/0033637 A1 | * | 2/2011 | Kim ....................... B05D 1/322 427/559 |
| 2012/0124863 A1 | | 5/2012 | Aveni et al. |
| 2012/0266355 A1 | | 10/2012 | Husain |
| 2013/0160223 A1 | | 6/2013 | Bier et al. |
| 2013/0233477 A1 | | 9/2013 | Bier et al. |
| 2014/0007458 A1 | | 1/2014 | Berger et al. |
| 2014/0053311 A1 | | 2/2014 | Nordstrom et al. |
| 2014/0189965 A1 | | 7/2014 | Miner |

FOREIGN PATENT DOCUMENTS

| | | |
|---|---|---|
| EP | 1279460 A1 | 1/2003 |
| GB | 2512142 A | 9/2014 |
| TW | M-345506 | 12/2008 |
| WO | WO-2012028206 A1 | 3/2012 |
| WO | WO-2012028348 A1 | 3/2012 |
| WO | WO-2013017738 A1 | 2/2013 |

OTHER PUBLICATIONS

International Search Report and Written Opinion in PCT/US2015/060112B dated Feb. 18, 2016, 12 pages.

* cited by examiner

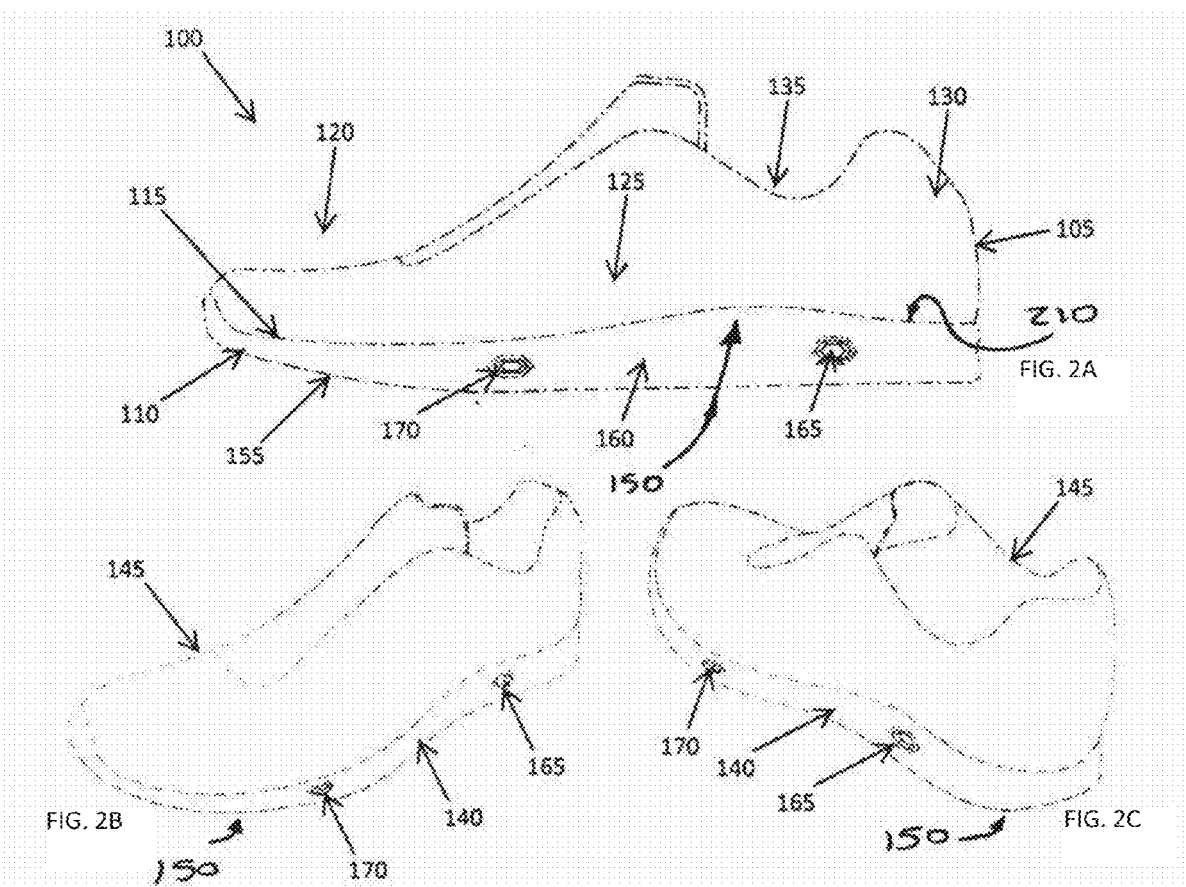
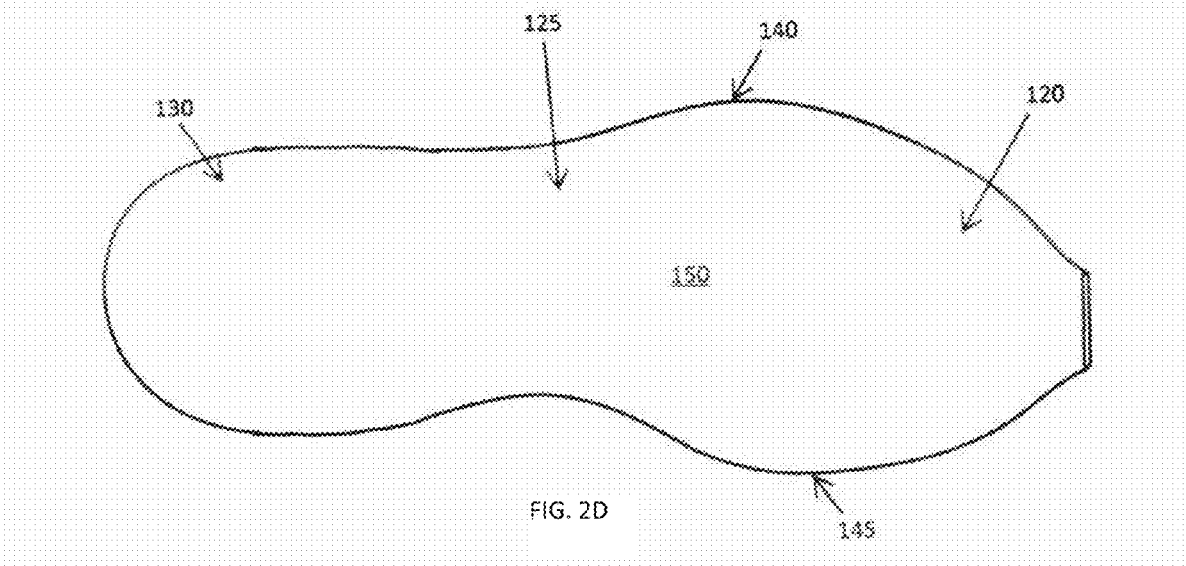

ALL 5mm deep

DIFFERENT DEPTHS:
1mm
3mm
5mm

METHOD OF PROVIDING DECORATIVE DESIGNS AND STRUCTURAL FEATURES ON AN ARTICLE OF FOOTWEAR

FIELD OF THE INVENTION

The present invention relates generally to the field of footwear and, more particularly, to footwear and portions thereof having structural features and decorative designs thereon, and related methods and systems for manufacturing same.

BACKGROUND OF THE INVENTION

The incorporation of complex structural features and decorative designs into articles of footwear often requires the use of complicated and expensive manufacturing processes and materials, time consuming and labor intensive manufacturing steps, and high labor, manufacturing, and material costs. These processes may include, for example, the manufacture and use of highly complicated and expensive multi-component molds and the need for time consuming and difficult manual processing and post-processing steps.

In addition, many aspects of the performance, comfort, and look of articles of footwear are dependent upon the performance and physical characteristics and needs of the wearer of the footwear, with athletes often seeking footwear specifically adapted for their performance, comfort, and aesthetic requirements, and for the specific activity being performed. Manufacturing performance athletic footwear specific to different athletes and athletic needs is often difficult without the use of complex and often expensive manufacturing processes, structural elements, materials, and/or other features. One possible solution to this is described in U.S. Provisional Patent Application No. 61/938,999, filed by the assignee/applicant in the instant case on Feb. 12, 2014 and entitled "Sole for Footwear, and Systems and Methods for Designing and Manufacturing Same," and U.S. patent application Ser. No. 14/134,948, filed by the assignee/applicant in the instant case on Dec. 19, 2013 and published as U.S. Publication No. 2014/0182170, and entitled "Customized Footwear, and Systems and Methods for Designing and Manufacturing Same," the disclosures of which are both incorporated herein by reference in their entirety. These cases include a description of methods and systems for forming at least a portion of the article of footwear (e.g., the midsole) by determining parameters related to a particular user or a particular athletic activity, determining performance metrics based on an analysis of the parameters, and, based on the performance metrics, forming appropriate structural features in the article of footwear.

SUMMARY OF THE INVENTION

Improvements in advanced manufacturing, customization, personalization, and individualization of footwear to include decorative designs and structural features are particularly appealing both to footwear manufacturers and consumers. Accordingly, it is desirable to provide various methods and systems for providing structural features and/or decorative designs in articles of footwear and, for example, in the midsoles of athletic footwear, that provide improved performance and aesthetics while also minimizing manufacturing costs.

The present invention is therefore, at least in part, directed towards footwear, and portions thereof, having structural elements incorporated into a wall thereof to provide optimized performance characteristics for the footwear without the need to incorporate complex multi-component and/or multi-material structures into the footwear and, furthermore, towards footwear, and portions thereof, having decorative designs incorporated onto a wall thereof to provide aesthetic features (including, but not limited to, customized, personalized, and individualized aesthetic features).

A first aspect of the invention includes a method for providing a feature on a surface of an object, such as at least a portion of an article of footwear, and articles of footwear manufactured thereby. Alternatively, the object may be an article of apparel or an article of protective equipment. The method includes positioning a laser proximate the surface of the object, directing a laser beam from the laser to the surface of the object to mark or engrave at least a portion of the surface of the object, and moving the laser and/or the object to create a pattern on the surface of the object, the pattern providing at least one of an aesthetic feature on, or a structural feature in, the surface of the object. The laser may, for example, be a UV laser or a $CO_2$ laser. In one embodiment the object includes at least one of an outsole, a midsole, an insole, and/or an upper of an article of footwear, or a portion thereof, and may include, for example, a sidewall portion of the midsole.

Marking the surface of the object may include changing a color of at least a portion of the surface of the object without removing material therefrom to provide the aesthetic feature on the surface of the object and, in one embodiment, the object may include at least one of an energy-absorbing, color-sensitive additive and a coloring agent to achieve a desired external color on the surface of the object when exposed to the laser.

The method may further include applying a masking medium to at least a portion of the surface of the object prior to activation of the laser, marking or engraving the surface of the object through the masking medium, and removing the masking medium. The method may include applying a fluid to the surface of the object prior to or throughout activation of the laser, the fluid acting to support the marking or engraving of the surface of the object and may, in one embodiment, include repeating the application of fluid to the surface being marked or engraved at one or more stages throughout the marking or engraving process. The fluid may be an aqueous solution and may, for example, include or consist essentially of water. The aqueous solution may also include an additive such as a surfactant (e.g., a soap).

In one embodiment engraving the surface of the object includes removing material therefrom to one or more predetermined depth to provide the aesthetic and/or structural features on the surface of the object. The predetermined depth(s) may, for example, be between about 0 mm to about 15 mm and may, in certain embodiments, differ at different locations on the surface. The change in depth may be abrupt and/or gradual, as appropriate for the specific structural and/or aesthetic feature(s) being created. For example, the structural feature may include a first region having a first depth, a second region having a second depth and, in one embodiment, a transition region wherein the depth changes from the first depth to the second depth. The transition region may include an abrupt and/or a gradual change in depth. In one embodiment the structural feature includes, or consists essentially of, a sculpted surface having a continuously changing depth.

In certain embodiments the method may include the steps of priming the engraved object (e.g., by immersing the engraved object into a primer solution to prime the engraved object), drying the primed object (e.g., through the application of heat), curing the primed object (e.g., by applying an ultra-violet light to the primed object), applying a coloring agent to color at least one engraved portion, and drying the coloring agent on the object (e.g., through the application of heat). The method may also include removing residue from the surface of the object during and/or after lasing. Removing the residue may include washing residue created during engraving from the object (using, for example, water), and drying the surface of the object.

Another aspect of the invention includes a method of producing an aesthetic feature on a surface of an object, and an object manufactured thereby. The method includes the steps of positioning a UV laser proximate the surface of the object, directing a laser beam from the laser to the surface of the object to change a color of at least a portion of the surface of the object without removing material therefrom, and moving the laser and/or the object to create a pattern on the surface of the object, the pattern providing an aesthetic feature on the surface of the object, wherein the object includes at least one of an outsole, a midsole, an insole, and/or an upper of an article of footwear.

Yet another aspect of the invention includes a method of providing an aesthetic or a structural feature on a surface of an object, and an object manufactured thereby. The method includes the steps of applying a masking medium to the surface of the object, wherein the object includes at least one of an outsole, a midsole, an insole, and/or an upper of an article of footwear, positioning a laser proximate the surface of the object, directing a laser beam from the laser to the surface of the object to remove material and masking medium therefrom to provide an aesthetic and/or structural feature on at least a portion of the surface of the object, and removing the masking medium. In one embodiment at least one color may be applied to the surface of the object prior to removing the masking medium, thereby coloring the structural features without coloring the surrounding, masked, regions. Applying the color may, for example, include priming the engraved object (e.g., by immersing the object into a primer solution to prime an unmasked portion of the surface of the object), drying the primed object (e.g., through the application of heat), curing the primed object (e.g., by applying an ultra-violet light to the primed object), coloring at least a portion of the unmasked portion of the surface of the object (e.g., by applying a coloring agent such as a paint), and drying the coloring agent on the object (e.g., through the application of heat). The primer solution may include, or consist essentially of, an ultra-violet primer.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described.

FIG. 2A is a side view of a shoe, in accordance with some embodiments of the invention;

FIG. 2B is a first perspective view from the lateral side of the shoe of FIG. 2A;

FIG. 2C is a second perspective view from the lateral side of the shoe of FIG. 2A;

FIG. 2D is a bottom view of an outsole of the shoe in FIG. 2A;

Figure 1A:
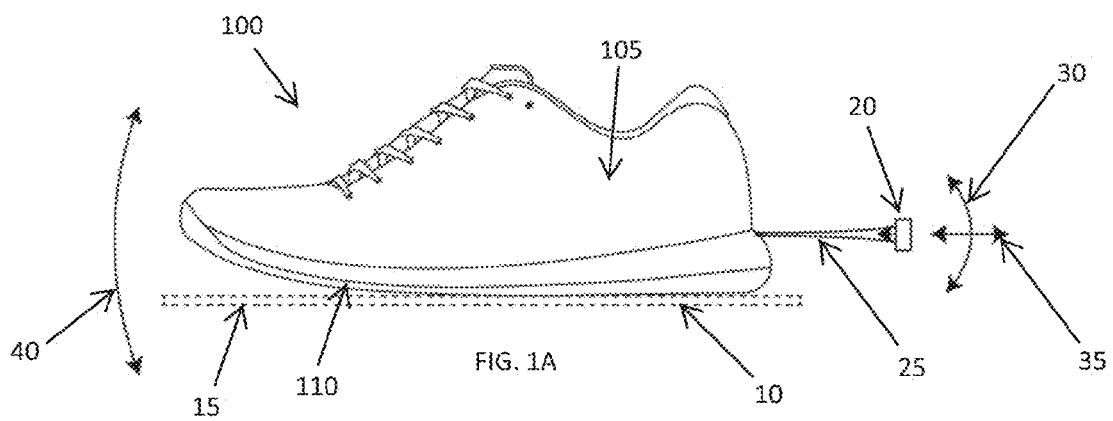
FIG. 1A is a side view of a system for laser marking or engraving a shoe, in accordance with some embodiments of the invention.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

DETAILED DESCRIPTION

Traditional methods of providing structural features and decorative designs to a shoe and, for example, a shoe sole for an athletic shoe, often involve the use of complicated and expensive shoe molds, significant cutting, buffing, skiving, painting or other post-processing and the use of multiple materials and complex mechanical structures in the sole. This can often be time consuming, costly, and add significant complexity to the manufacturing of the shoe. As such, a need exists for shoes having improved decorative designs and/or structural elements that provide superior aesthetic and performance characteristics for the shoe without the need for manufacturing the shoe sole from multiple materials and/or complex mechanical structures or through complex and expensive manufacturing techniques.

The invention described herein provides shoes, and elements thereof, with improved aesthetic and/or performance characteristics without requiring complicated molding, post-processing, or the addition of further materials or separate structural elements and, furthermore, allows for the improved manufacturing of customized, personalized, and/or individualized decorative designs and structural features. In some aspects of the invention, this is achieved through the use of one or more lasers to create precisely located and shaped structural features and/or selectively placed and shaped decorative features on one or more surface of the shoe (and, for example, at least a portion of a sole of the shoe) and/or selectively coloring all or some portion of the shoe. The configuration, location, and distribution of the aesthetic and/or structural features may be readily applied to the shoe using laser marking and/or engraving methods. In addition, the laser marking and/or engraving may be combined with various means of applying color to a surface to produce unique aesthetic designs. As a result, shoe elements and, for example, simple one-piece shoe midsoles (or midsoles having other straightforward sole constructions) can be formed with performance characteristics optimized for particular users or particular athletic activities and with unique decorative features in a cost effective, efficient, and repeatable manner.

Shoe soles or sole elements (e.g., the outsole, midsole, and/or insole) described herein may be manufactured from any appropriate technique. For example, shoe midsoles, or portions thereof, may be manufactured from molding methods such as, but not limited to, expansion molding, die-cutting, sculpting of foamed material, compression molding, and/or three-dimensional printing or additive manufacturing (e.g., through selective laser sintering). Materials used for the soles, and sole elements, described herein may include, but are not limited to, polymeric material which may include, or consist essentially of, polymers, elastomers, and/or thermoplastics. For example, the polymeric material may be ethylene vinyl acetate (EVA), EVA copolymers, polyethylene (PE), chlorinated polyethylene (CPE), polyurethane (PU), thermoplastic polyurethane (TPU), DuPont™ Surlyn®, or rubber (such as, but not limited to, normal rubber, blown rubber, thermoplastic rubber (TPR), nitrile-butadiene rubber (IBR), nitrile rubber, butadiene rubber, or isoprene rubber). In one exemplary embodiment, the polymeric material is a ground-contact EVA (i.e., an EVA formulated specifically to provide appropriate performance, wear, and durability characteristics to allow it to be used as the ground-contacting surface of a shoe sole).

Forming shoe soles having structural and/or aesthetic features on one or more surface thereof (such as, for example, a side wall, upper surface, and/or lower surface of a midsole, a ground contacting side wall, or upper surface of an outsole, or an upper and/or lower surface of an insole) potentially provides performance characteristics and decorative characteristics that allows for the creation of footwear, or footwear elements, that are specifically customized to meet one or more needs of an athletic activity, and/or a specific athlete or group of athletes, to improve the performance of the athlete during athletic activity, to improve the comfort of the article of footwear when worn, to provide unique design features, and/or to provide a degree of customization and individualization to satisfy the athlete's personal performance and/or aesthetic preferences. The customization of footwear may, for example, be beneficial for numerous groups such as, but not limited to, elite athletes (who are looking for optimized performance from their footwear), people with medical conditions (who are looking for specifically designed footwear providing better cushioning, support and/or treatment for their specific condition), and casual runners or walkers, who are often looking for footwear having both improved and customized performance benefits and/or a customized aesthetic look (including, for example, decorative elements, trademarks, names, images, graphics, etc.).

One aspect of the invention described herein allows for the creation of articles of footwear (e.g., shoes, flip-flops, sandals, socks, athletic supports such as compression support elements, etc.), and/or elements for incorporation into a finished article of footwear, that provide superior performance and/or decorative features (including customized, personalized, and individualized features) without adding significant cost or complexity to the article and its manufacture. Exemplary footwear elements include, but are not limited to, an outsole, midsole, and/or insole for a shoe or elements for placement within an outsole, midsole, and/or insole such as a cushioning or stability element for insertion into or attachment to (e.g., through mechanical attachment, bonding, or other appropriate attachment means) the sole of a shoe at a specific region thereof (e.g., in a heel, midfoot, and/or forefoot region).

Performance features of the footwear or footwear elements that may be controlled, improved, or otherwise adapted by the methods and systems described herein may be based on a number of physical, performance (e.g., kinematic performance), and/or user preference characteristics associated with an individual or group of individuals. For example, performance aspects of a specific athlete, or subset of athletes, such as, but not limited to, footstrike location (e.g., heel-strike, midfoot strike, or forefoot strike during initial ground contact of a foot during a gait cycle or other athletic motion), stride length, stride rate (i.e., cadence), pronation or supination of the foot upon footstrike, pivoting of the foot during ground strike and toe-off, running style, running speed, and/or flexibility of one or more joints, may be addressed through the creation of carefully selected structural elements on the footwear, with specific performance characteristics being supported or compensated for, as needed, to improve the performance of the athlete during athletic activity and/or improve the comfort of the footwear worn during the athletic activity.

In addition, the performance requirements of a specific athletic activity can be taken into account when shaping, positioning, and orienting wall elements for footwear (and, for example, footwear soles or elements or portions thereof) for a specific athlete or subset of athletes. For example, performance and traction requirements for a runner (such as a track runner, a road runner, or a cross-country runner) may be different depending on whether the runner is a sprinter or long distance runner, and/or whether the runner requires the footwear to account for running around a corner (e.g., on a standard indoor or outdoor athletic track), or whether the running is to be carried out in a predominantly straight line (e.g., during road racing or jogging). The design of the footwear may also depend upon the weather, terrain, and underfoot conditions in which the athlete is performing with, for example, different traction requirements being needed for wet/dry conditions or soft/firm underfoot conditions. In addition, different sports may require different shapes, sizes, and configurations of structural elements with, for example, shoes for soccer, American football, field hockey, baseball, etc. all requiring different structural performance requirements.

Structural features and/or aesthetic design elements can be optimized for various sports and athletic motions. Example sports include, but are not limited to, basketball, baseball, softball, soccer, American Football, field hockey, ice hockey, ice skating, speed skating, rugby, tennis, squash, racquetball, skateboarding, cycling, sprinting, middle or long distance running, cross-country running, and/or any track and field event. Athletic activities for which footwear elements can be optimized include, for example, running, cutting, jumping, crouching, kicking, throwing, turning, and/or spinning.

One embodiment of the invention includes the use of one or more lasers in the creation of aesthetic designs on the surface of an object (and, for example, the surface of an article of footwear, or a component thereof) by marking the surface of the object without removing material from the surface and/or changing the structural characteristics of the underlying material. Such marking, whereby the parameters of the laser beam are selected to produce a permanent change in color of the surface of the object without noticeably engraving, etching, ablating, or otherwise removing material from the surface of the object, allows for the creating of aesthetic patterns on the surface of the object without affecting the structural integrity of the object.

In one embodiment the object (for example a midsole and/or outsole for an article of footwear) may have an energy-absorbing, color-sensitive additive or coloring agent embedded therein and/or applied thereto to assist in changing the color of the surface of the object upon exposure to the laser and to ensure that a specific desired external color on the surface of the object is created upon exposure to the laser. For example, in one embodiment the laser (e.g., a low temperature UV laser) can focus light onto the surface to alter the pigment in the composition material to modify the color via mechanisms such as, but not necessarily limited to, photochemical reactions. Beneficially, this coloration can be performed without chemicals and avoids having to excessively heat or burn the material, leaving the colored area unchanged with the same physical properties of the uncolored area. In an alternative embodiment the object may be formed of a material that allows for the required color change without the need for any additive or coloring agent to be embedded within or applied to the object. Colors may, for example, be white, black, or grey scale colors, although other colors may be created depending upon the specific chemical properties of the materials being utilized. For example, the object material and/or appropriate coloring agents and/or additives on or in the composition of the object, may be selected such that any appropriate color(s) may be produced.

In one embodiment the material in an object can be selected and/or treated such that exposing the surface of the object (such as a sole of a shoe) to a laser beam can change a physical and/or chemical property of the material proximate the laser-exposed region. For example, a midsole material can be selected such that exposing a portion of the midsole to the laser changes a density, stiffness, and/or other structural property of the exposed material, thereby changing at least one performance characteristic of the material at that region of the midsole. In addition, or alternatively, exposing material to a laser beam may change a chemical property of the exposed material such as, but not limited to, changing the exposed materials affinity for water or another liquid (e.g., changing the material from a hydrophobic to a hydrophilic material). This may be advantageous, for example, in allowing the shoe to be post processed to paint or otherwise provide color to the shoe, with only the laser-exposed portions (or, alternatively, only the non-laser-exposed portions) holding the paint and being colored thereby.

Another embodiment of the invention includes the use of one or more lasers in the creation of structural and/or aesthetic surface features on an object (and, for example, the surface of an article of footwear) by engraving the surface, wherein engraving involves the selection of parameters for the laser beam expressly for the purpose of carefully and accurately engraving, cutting, sculpting, physically etching, ablating, melting, or otherwise removing material from the original surface of the object to create a new, sculpted surface and thereby create three-dimensional aesthetic and/or structural patterns (i.e., patterns which produce a change in at least one structural property of the object in) on and in the sculpted surface of the object.

Figure 1B:
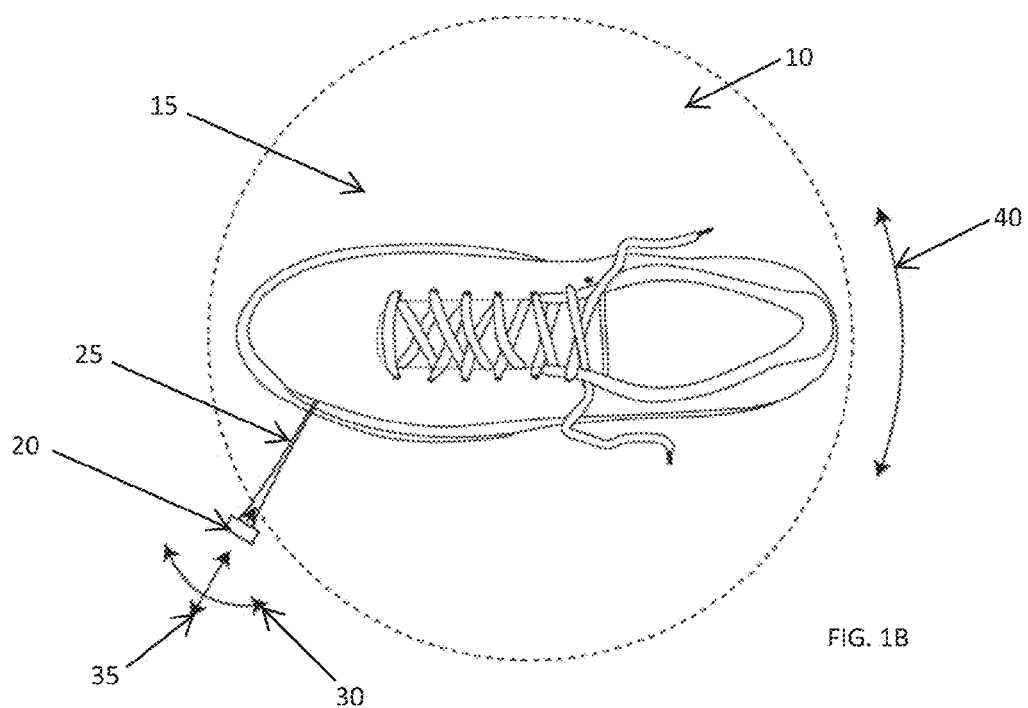
FIG. 1B is a top view of the system of FIG. 1A.
Figure 1C:
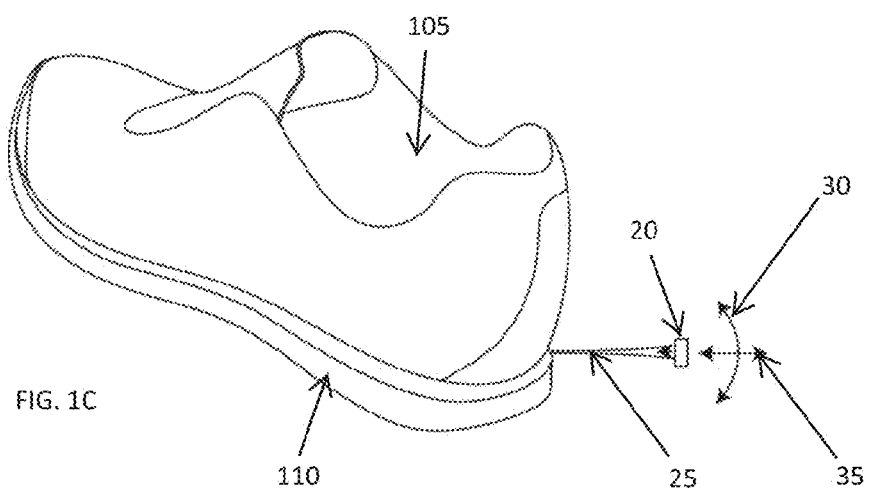
FIG. 1C is a first perspective view of the system of FIG. 1A.

An example method and system for marking and/or engraving a midsole of a shoe is shown in FIGS. 1A to 1C. In this embodiment, a shoe 100 having an upper 105 and a sole 110 is positioned on a mounting system 10. In one embodiment, as shown in FIGS. 1A and 1B, the mounting system 10 includes a plate 15 onto which the shoe 100 is positioned. In alternative embodiments the mounting system 10 may include any appropriate mechanism for holding the shoe 100 and may, for example, include one or more clamping elements for holding the shoe 100 or a shoe last onto which the shoe 100 is placed and held. The mounting system 10 may be configured to allow any appropriate portion of the surface of the shoe 100 to be exposed, depending upon which specific portions of the shoe 100 are to be engraved and/or marked.

The engraving/marking system further includes one or more lasers 20 which direct a laser beam 25 towards the appropriate surface region of the shoe 100 to engrave and/or mark the surface of the shoe 100 as required. The laser 20 may be mounted in any appropriate manner. In one embodiment, the laser 20 for use in marking the surface of a shoe 100 is an Ultra-Violet ("UV") laser (and, for example, a low-temperature UV laser such as a UV laser marking machine—Model No. 8 W—8 W Air Cooling—manufactured by G D Han's Yueming Laser Tech Co., Ltd.). In one embodiment, the laser 20 for use in engraving into the surface of a shoe 100 is a $CO_2$ laser (and, for example, a 1.064 nm $CO_2$ laser). In an alternative embodiment any appropriate steady state or pulsed laser source producing a beam having the appropriate power, wavelength, beam size, etc., may be used in the marking and/or engraving of the shoe 100, such as a solid state laser (e.g., a Nd:YAG Laser), gas laser, excimer laser, dye laser, or semiconductor laser.

The laser 20 may be held in a fixed position, with the mounting system 10 including a movable fixture designed to move the location and orientation of the shoe 100 with respect to the laser beam 25. In an alternative embodiment the mounting system 10 holds the shoe 100 in a fixed position, with the position and orientation of the laser 20 being movable in order to create the required engraving and/or marking pattern on the shoe 100. In a further embodiment both the shoe 100 and the laser 20 may be held in moveable mounting fixtures to allow them both to be moved with respect to the other. For example, the laser 20 can be held in a fixture allowing for changes in both angle or orientation 30 and distance 35 between the laser 20 and the shoe 100, while the mounting system 10 may also be adapted to change the angle of orientation 40 and distance between the shoe 100 and the laser 20, as appropriate.

The laser may be directed at any appropriate fixed or variable angle toward the surface of the object being treated and may, for example, be positioned perpendicular to the surface (i.e., at 90° to the surface) or at an acute angle to the surface (e.g., at an angle of between about 90° to about 30° from the surface, or less). In addition, the laser may be directed towards the surface with any appropriate power and/or beam diameter, and may be located any appropriate distance from the surface. Controlling laser parameters such as, but not limited to, the laser power, beam size, waist diameter and location, frequency, and collimation, pulse speed, the distance to object, and the angle with respect to the object can allow for the highly accurate control the size and shape of the elements being engraved into and/or marked onto the surface of the object. In addition, allowing for changes in one or more of the laser power, beam size, distance to object, and angle with respect to the object can allow for precise changes to the properties of the marked and/or engraved patterns at different regions of the object. In addition, different materials may require different laser properties to produce the required marked and/or engraved patterns thereon, and allowing for changes to the laser properties throughout the marking and/or engraving process allows for the consistent formation of patterns over an object having multiple different surface materials thereon (e.g., a shoe sole having an EVA midsole and a rubber outsole).

In one embodiment one or more fluid may be applied to the surface of the object prior to and/or throughout the exposure of the object to the laser, the fluid acting to support the marking or engraving of the surface of the object and, for example, to ensure that the laser doesn't burn or otherwise damage the material during the marking and/or engraving process. This fluid application may be repeated at appropriate intervals during the marking and/or engraving process, as required. The fluid may be sprayed, wiped, brushed, painted or otherwise applied to the object, or the object may be dipped into the fluid to ensure an appropriate coating of the fluid to the object's surface. The fluid may include, or consist essentially of, an aqueous solution such as, but not limited to, water, and may, in certain embodiments, include an additive (e.g., a surfactant such as, but not limited to, a soap).

An exemplary shoe 100 having structural features created thereon is shown in FIGS. 2A through 2D. The shoe 100 includes an upper 105 with a sole 110 attached to a bottom portion 115 thereof. The shoe 100 includes a forefoot region 120, a midfoot region 125, a heel region 130, and an opening 135 into which a foot can be received. The shoe 100 further includes a lateral side 140 and a medial side 145. The sole 110 includes a midsole 150 having an upper surface 210 facing towards an interior of the shoe 100 and a lower surface 155 facing towards the ground when the shoe 100 is in contact with the ground. In one embodiment the midsole 150 may be formed from a material such as, but not limited to, EVA, and, for example, a ground contact EVA having appropriate performance, traction, wear, and durability characteristics to allow it to be used as the ground-contacting surface of a shoe sole 110. In an alternative embodiment one or more outsole elements (e.g., a rubber outsole element) may be attached to the lower surface 155 to provide the appropriate ground-contacting characteristics for the shoe 100.

The midsole 150 further includes a sidewall 160 extending around a periphery of the midsole 150. In some embodiments and variations, geometric structural features and/or decorative designs are incorporated into the sidewall 160 and/or outsole through laser marking and/or engraving to provide specific structural, performance, and aesthetic characteristics to various regions of the sidewall 160 and the midsole 150. These geometric features may include, for example, one or more structural elements (e.g., cavities, grooves, or other holes—e.g., concave elements 165— extending into the sidewall 160 and/or one or more raised structures—e.g., convex elements 170—extending out from the sidewall 160, which may be formed by removing material around a portion of the surface, thereby leaving a raised element on the surface). The structural elements may be of any number and arrangement, and of any appropriate shape, size, orientation, and depth and, moreover, may be arranged in any appropriate manner depending upon the specific structural, performance, and aesthetic characteristics required or desired. For example, the concave elements 165 and convex elements 170 may be formed as portions of discrete spheroidal (e.g., portions of oblate, a prolate, or a spherical spheroids) or portions of discrete polyhedronal elements extending in or out from the sidewall 160. Example polyhedronal elements may include polyhedron shapes such as, but not limited to, tetrahedrons (i.e., a polyhedron having four triangular faces), cubes, octahedrons, dodecahedrons, icosahedrons, etc.) and, for example, three-dimensional shapes having triangular, square, rectangular, pentagonal, hexagonal or higher order cross-sections. The elements may be regular or irregular in shape and/or may be symmetrical or asymmetrical.

In various embodiments, the structural elements may extend inwards and outwards from the surface of the object (e.g., the shoe sole) to any appropriate extent (i.e., the structural elements may have any appropriate thickness/ depth), and the side walls of the structural elements may extend at any acute angle (e.g., between about 5° to almost 90°, or between 10° to 80°, or between 20° to 70°) or obtuse angle (e.g., between about 90° to about 135°) or extend perpendicular, or substantially perpendicular, to the peripheral surface of the sidewall 160. In some implementations, the cross-sectional shape of the structural elements may remain substantially constant over the thickness/depth of each element. In other implementations, the cross-sectional shape may change over the thickness/depth of the element (in addition to, or instead of, a change in the area of the cross-section over the thickness/depth of each element). The thickness/depth of the structural elements may be constant or vary over the extent of the shoe wall.

In some embodiments, placing one or more concave elements 165 on the sidewall 160 can reduce the stiffness of the sidewall 160 at that portion by reducing the volume of material at that portion of the sidewall 160, thereby reducing the density of the material over that sidewall 160 portion. This can therefore increase the compressibility of that portion of the sidewall 160 and therefore create a localized region of greater, or softer, cushioning at that region. The extent to which the concave elements 165 can change the cushioning of the midsole 150 proximate the location of the concave elements 165 may depend on factors such as, but not limited to, the size, thickness/depth, shape, orientation, and/or distribution of the concave elements 165 within the sidewall 160 region. In addition, the properties of the material used in the midsole 150 such as, but not limited to, the structural properties of an outer skin layer (e.g., the thickness of the skin layer, the stiffness of the layer, and/or the difference in stiffness of the skin layer with respect to the interior foam of the midsole 150) can affect the extent to which the concave elements 165 change the cushioning properties of the midsole 150 proximate the elements) 165. In one embodiment, increasing the thickness/depth of the concave elements 165 (i.e., increasing the distance into the midsole 150 which the concave elements 165 extend) reduces the stiffness of the midsole around the concave elements 165, thereby making the midsole 150 effectively softer in that region.

Similarly, the size, thickness/depth, shape, orientation, and/or distribution of one or more convex element 170 on a portion of the sidewall 160 may affect the cushioning properties of the midsole 150 proximate the convex elements 170. For example, convex elements 170 on the sidewall 160 can provide additional resistance to compression and/or flexure of the sole and therefore affect the structural properties of the sidewall 160 (and the midsole 150 proximate that portion of the sidewall 160) in the region where the convex elements 170 are added.

Other structural features that may be formed hereby include grooves (e.g., flex grooves), holes, cavities, slots, traction elements, and/or any other appropriate discrete or conjoined surface structure. For example, flex grooves of any appropriate size, shape, and or orientation may be formed on the surface of a shoe midsole to provide appropriate flexibility to that region of the midsole. In various embodiments the size, shape, orientation, depth, and other structural features of engraved elements (and/or size, shape, and orientation of marked elements) may either vary or remain constant over the region of the surface being treated. In one embodiment the methods and systems described herein may be used to create any appropriate marked or engraved shape including, but not limited to, constant or changing geometric patterns, written words and/or numbers, and/or aesthetic designs and images such as, but not limited to, trademarks, sports team identifying indicia, maps, faces, etc. More particularly, embodiments of the methods and systems described herein allow for the engraving of a broad variety of complex three-dimensional sculpted features into the surface of an object, with carefully controlled changes in elements such as the power, time, angle, and distance to the surface of the object of the engraving laser beam (or beams) allowing for the creation of engraved surface features having highly complex and detailed three-dimensional surfaces.

In some embodiments, the laser may be used to apply texturing of the surface of the shoe (and, for example, the sidewall 160 and/or outsole) in addition to the incorporation of aesthetic and/or structural elements. Texturing (i.e., adding a shallow surface pattern or roughness to the surface of the wall for aesthetic purposes) may be applied on regions of the sidewall 160 around or away from the structural elements, or may be applied over the surface of the structural elements in addition to, or instead of, to the surrounding sidewall 160. All or some portion of the shallow surface patterns and/or surface roughness resulting from texturing may also be colored (e.g., painted) to enhance the aesthetics further.

Illustrative structural features and/or decorative designs for portions of a shoe sole 110 are shown in FIGS. 3A to 3M. Those of ordinary skill in the art can appreciate that the structural features and decorative designs shown in FIGS. 3A to 3M are shown for the purpose of illustration, not limitation.

Figure 3A:
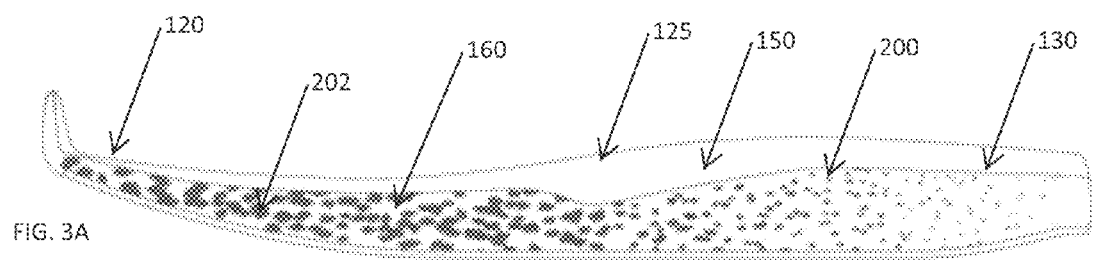
FIG. 3A is a side view of a shoe sole with a first variation of a decorative and/or structural design, in accordance with some embodiments of the invention.

For example, FIG. 3A depicts a midsole 150 having a sidewall 160 incorporating a pattern of indentations or holes of varying hole size, depth, and density, with smaller, shallower holes 200 in a heel region 130 transitioning to larger, deeper holes 202 in the forefoot region 120. In alternative embodiments the holes may be of any appropriate constant or varying size, depth, shape, and/or density, and the pattern may be randomized or organized in any appropriate manner. Varying the size, depth, and/or density of the holes in different regions of the sidewall 160 may be advantageous, in one embodiment, in changing the flexibility and/or cushioning properties of the midsole 150 proximate the holes, with larger, deeper, and/or more closely packed holes reducing the density of the midsole 150 at that region and therefore making the midsole 150 softer and more compressible at that region.

Figure 3B:
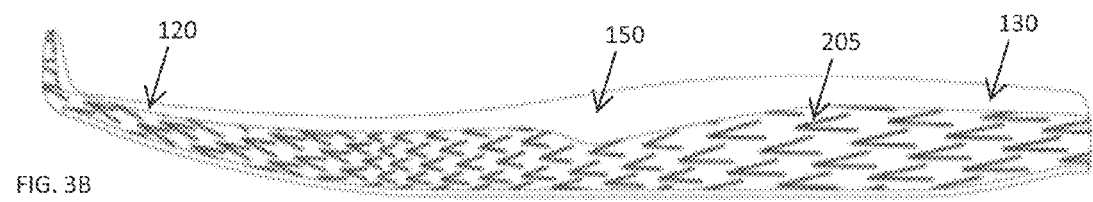
FIG. 3B is a side view of a shoe sole with a second variation of a decorative and/or structural design, in accordance with some embodiments of the invention.

FIG. 3B depicts a midsole 150 having a sidewall 160 incorporating a series of chevron-shaped features 205 of varying size, depth, and/or density, with larger, less dense chevrons 205 in a heel region 130 transitioning to smaller, more dense chevrons 205 in the forefoot region 120. Again, the size, depth, and density of the chevrons 205 can change the flexibility and/or cushioning of the midsole 150 proximate the chevrons 205. In addition, the orientation of the chevrons 205 may, in one embodiment, preferentially support compression of the midsole 150 in one or more specific direction, with the chevrons 205, for example, oriented in a direction supporting greater compression (or cushioning) of the midsole 150 as the shoe first contacts the ground during a footstrike event (at a first angle) and providing less compression, and therefore a more rigid surface from which an athlete can push off, during the toe-off portion of the footstrike event (at a second, different angle).

Figure 3C:
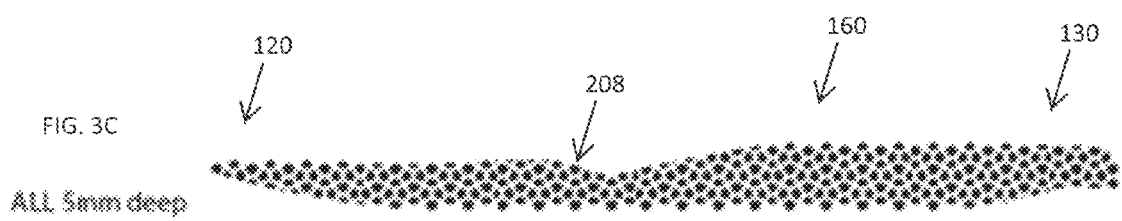
FIG. 3C is a side view of a shoe sole with a third variation of a decorative and/or structural design, in accordance with some embodiments of the invention.
Figure 3D:
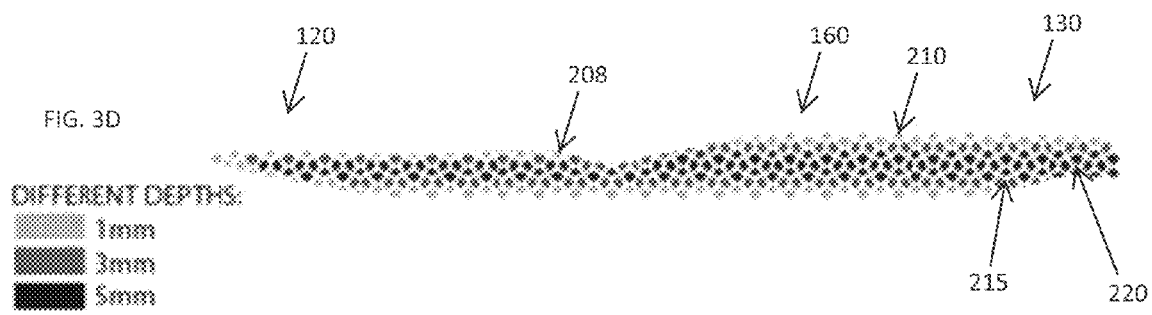
FIG. 3D is a side view of a shoe sole with a fourth variation of a decorative and/or structural design, in accordance with some embodiments of the invention.

Holes, indentations, flex grooves, or other surface features may be of a uniform (or substantially uniform) depth over the shoe sole 110 (or a portion thereof), or may vary in depth between different regions of the shoe sole 110. The variation in depth may be either abrupt or gradual, depending upon the specific structural and/or aesthetic effects required. For example, FIG. 3C depicts an organized pattern of holes 208 of substantially uniform depth (in this case, about 5 mm), while FIG. 3D depicts a hole pattern with the depth of the holes 208 varying between about 1 mm (on the outer region 210 of the sidewall 160), about 3 mm (in the intermediate region 215 of the sidewall 160) and about 5 mm (in the central region 220 of the sidewall 160) over the length of the midsole 160. In various embodiments the depth of the features engraved into the walls of the shoe may range from 0 mm up to 25 mm, or more. In one embodiment the features may be channels that extend completely through the object (e.g., the midsole) from one surface to another (for example, for ventilation purposes or to allow for attachment of an additional structure).

The structural features may extend over the full length of the shoe sole 110 or over only a portion thereof. This may be advantageous, for example, in providing less dense, and therefore more cushioned, sole portions in certain regions of the shoe sole 110 (proximate the engraved-out features) and more dense, and therefore firmer, sole portions proximate regions without engraved-out wall regions. For example, creating a shoe having a single, unitary, material midsole 150 having engraved-out wall portions in the heel region 130, with no engraved-out regions in the forefoot region 120, will produce a midsole 150 with increased cushioning in the heel region 130 (which can be beneficial during foot landing) and a firmer forefoot region 120 (which can provide performance benefits during toe-off). In addition, the systems and methods described herein allow for the provision of deeper flex grooves and/or a greater number of flex grooves in regions where high flexibility is required, while regions requiring less flexibility can have fewer and/or shallower flex grooves or even no flex grooves.

In certain embodiments such structural features can be restricted to limited portions of the shoe. For example, various embodiments of the shoes can include engraved-out features only on a medial or lateral side (or have different engraved-out features on the lateral and medial side) and/or only have engraved-out structural features in the forefoot, midfoot, and/or heel regions (or portions thereof). For example, stability and pronation control shoes often require a stiffer medial side (at least in the midfoot region) and a softer, more cushioned, lateral side (often in the heel and midfoot regions) the methods and systems described herein allow for the creation of a single material midsole having engraved-out portions on the lateral heel and later midfoot regions to increase the cushioning of the midfoot in those regions with respect to the medial side of the shoe.

Figure 3E:
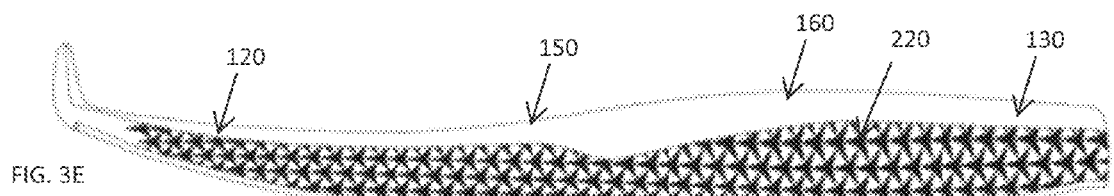
FIG. 3E is a side view of a shoe sole with a fifth variation of a decorative and/or structural design, in accordance with some embodiments of the invention.
Figure 3F:
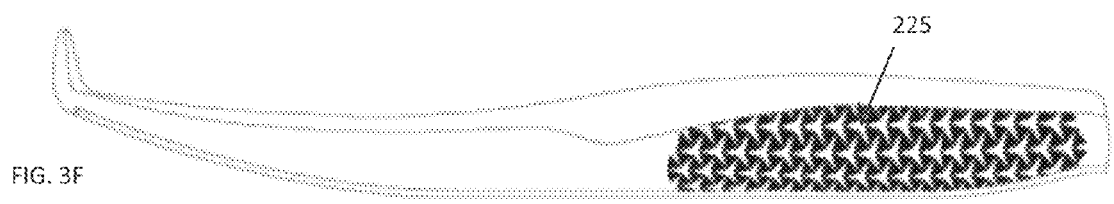
FIG. 3F is a side view of a shoe sole with a sixth variation of a decorative and/or structural design, in accordance with some embodiments of the invention.

The methods and systems described herein provide means for creating complex geometric structural wall features having any appropriate shape and arrangement. An example midsole 150 having a sidewall 160 including a series of stylized triangular-shaped indented features 220 of varying size and density with larger, less dense features in a heel region 130 transitioning to smaller, more dense features in the forefoot region 120, is shown in FIG. 3E (with the indented features 220 extending almost the entire length of the midsole 150), while a midsole 150 having a sidewall 160 including a series of stylized triangular-shaped raised features 225 of varying size and uniform depth is shown in FIG. 3F, with the features 225 limited in this embodiment to the heel region 130.

Figure 3G:
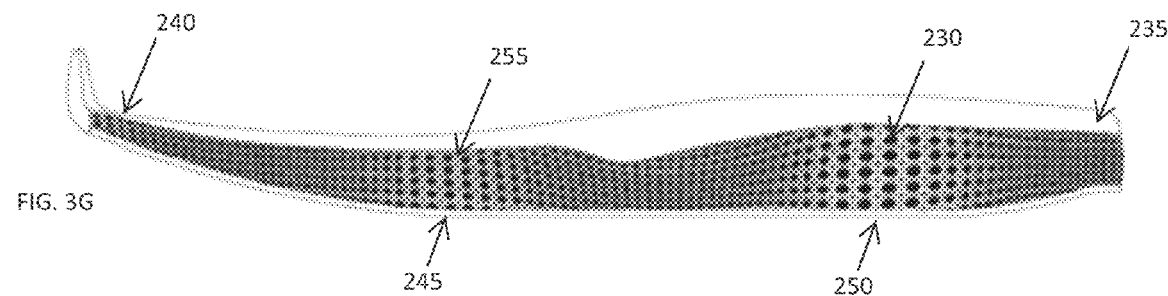
FIG. 3G is a side view of a shoe sole with a seventh variation of a decorative and/or structural design, in accordance with some embodiments of the invention.

FIG. 3G depicts a midsole 150 having a sidewall 160 including a pattern comprising a grid 255 of varying size and shape with a circular or substantially circular features 230 of varying size in each grid square with smaller, more dense grids and circular features 230 in the midfoot region 125, and at the rear heel region 235 and the toe region 240 and with larger, less dense grids and circular features 230 in the region 245 proximate the metatarsal heads of the foot and the region 250 proximate the ball of the heel of the foot.

Figure 3H:
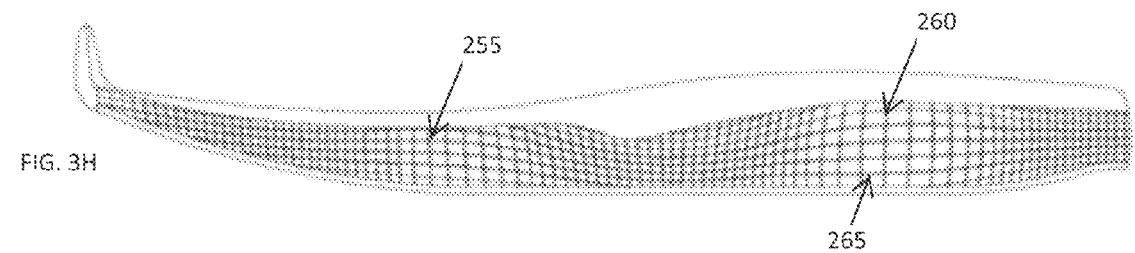
FIG. 3H is a side view of a shoe sole with an eighth variation of a decorative and/or structural design, in accordance with some embodiments of the invention.

FIG. 3H depicts a midsole 150 having a sidewall 160 including a pattern comprising a grid 255 of grooves (and, for example, flexibility enhancing grooves, or flex-grooves) of varying size and shape with the grid 255 including a plurality of substantially vertical grooves 260 and a plurality of substantially longitudinally extending grooves 265. In various embodiment the grooves 260, 265 may be orientated at any appropriate angles with respect to each other and with respect to the longitudinal axis of the shoe.

Figure 3I:
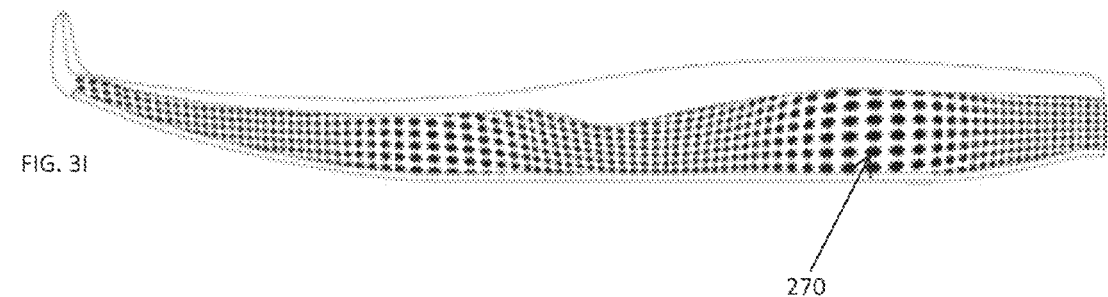
FIG. 3I is a side view of a shoe sole with a ninth variation of a decorative and/or structural design, in accordance with some embodiments of the invention.

FIG. 3I depicts a midsole. 150 having a sidewall 160 including a pattern comprising circular or substantially circular features 270 of varying size extending over substantially the entire length of the shoe sole 110.

Figure 3J:
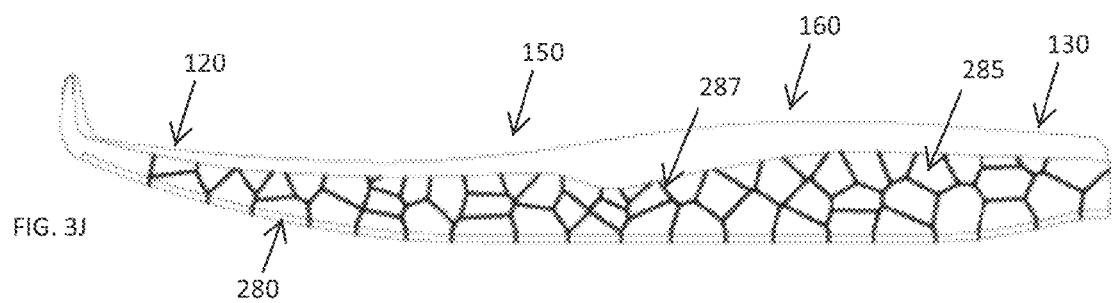
FIG. 3J is a side view of a shoe sole with a tenth variation of a decorative and/or structural design, in accordance with some embodiments of the invention.
Figure 3K:
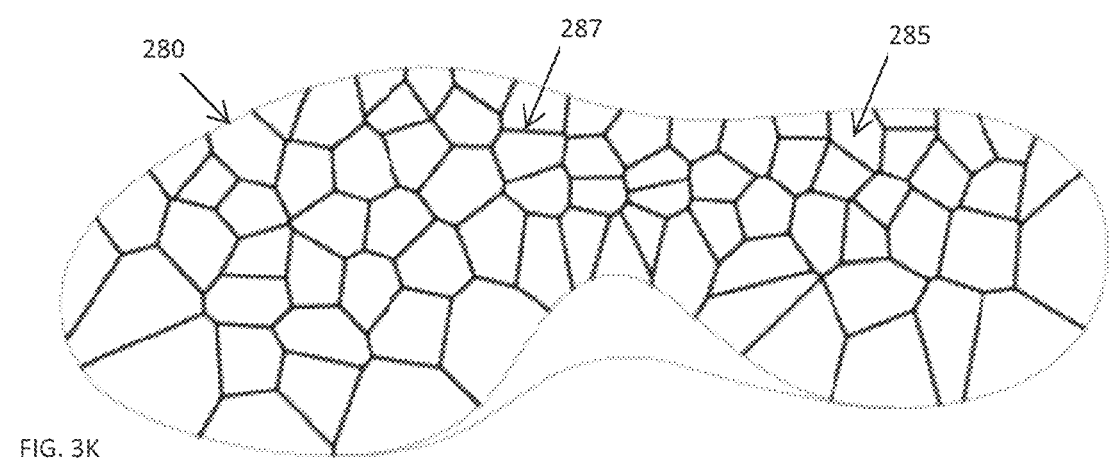
FIG. 3K is a bottom view of an shoe sole of FIG. 3J.

In one embodiment the systems and methods described herein can be used to create a shoe sole having a pattern that extends over both the sidewalls 160 and the ground contacting lower surface 155 of the shoe sole 110 (or one or more portions thereof). This may require the pattern be extended over multiple materials with, for example, the pattern extending over the surface of an EVA midsole 150 and the surface of a rubber outsole 280. FIGS. 3J and 3K, for example, depict a shoe sole 110 having a randomized pattern of polygons 285 (formed by engraving grooves 287 into the surface) extending over both the sidewall 160 and ground contacting lower surface 155. In further embodiments an engraved and/or marked pattern can extend over any portion of the shoe and, for example, over at least a portion of an upper and sole portion of the shoe.

Figure 3L:
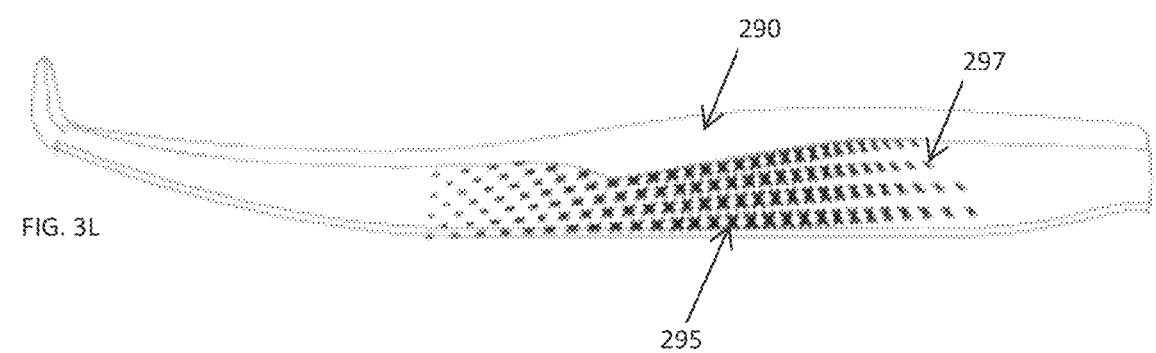
FIG. 3L is a side view of a shoe sole with an eleventh variation of a decorative and/or structural design, in accordance with some embodiments of the invention.

FIG. 3L depicts a midsole 150 having a sidewall 160 including a pattern comprising a series of X-shaped cavities extending over the medial midfoot region 125 of the midsole 150, the cavities varying in size, shape, and density with larger, more dense cavities 295 at central portion 290 of the engraved region and smaller, less dense X-shaped cavities 297 transitioning towards the edges of the engraved region. In one embodiment, the cavities (or some of the cavities) may be filled, or at least partially with a material to provide additional aesthetic and/or structural benefits. For example, the cavities 295 can be filled with a material having a higher density than that of the surrounding midsole 150, thereby providing a region of increased density to provide a stability region in the shoe midsole 150. In addition, or alternatively, the fill material may have a contrasting color to that of the midsole 150 to provide a unique visual aspect to the midsole 150. In one embodiment the fill material can include a luminescent material (e.g., a photoluminescent material). The fill material may be inserted into the cavities 295 as a solid or applied to the cavities 295 as a liquid or gel which thereafter solidifies in place. In one embodiment the fill material may include, or consist essentially of, paint.

Figure 3M:
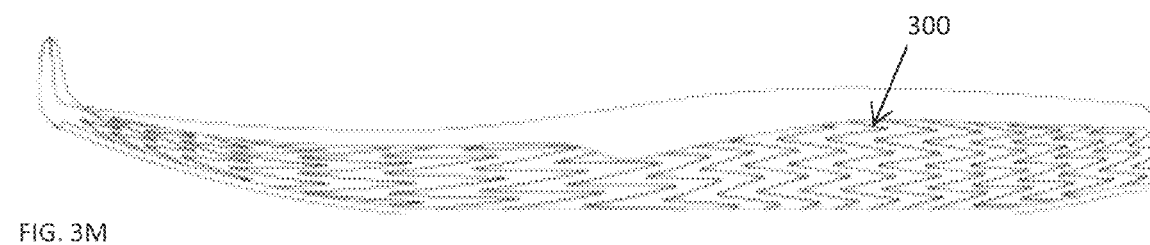
FIG. 3M is a side view of a shoe sole with a twelfth variation of a decorative and/or structural design, in accordance with some embodiments of the invention.

FIG. 3M depicts a midsole 150 having a sidewall 160 including a series of engraved saw-tooth wave features 300 of varying size and density, with larger, less dense wave features in a midfoot region 125, transitioning to much smaller, more dense wave features at a forefoot region 120, and to slightly smaller, more dense wave features at a heel region 130.

The patterns shown in FIGS. 3A-3M are examples of engraved structural features located at various portions and in various configurations on the midsole and outsole of a shoe. In alternative embodiments any appropriate arrangement of structural wall features may be created, depending upon the specific performance characteristics and aesthetic requirements of the midsole. In addition to engraved structural features, the methods and systems described herein can be utilized to create aesthetic surface markings having the patterns shown in FIGS. 3A-3M, or any other appropriate aesthetic design.

One aspect of the invention includes a method and system for creating a unique aesthetic design on a wall of a shoe through the application of one or more color to the engraved-out wall portions created hereby. This may be achieved, for example, by forming the sole (or a portion thereof) entirely, or substantially, from a material having a first color, and thereafter selectively adding a second, contrasting color to the engraved-out features to create a visual effect indicating the difference in structures over regions of the shoe sole. In one embodiment three or more colors may be used to create more complex shading and coloring.

In one embodiment the color is applied by painting or otherwise coloring the surface of an object (e.g., a shoe midsole) with one or more contrasting color and thereafter laser engraving into the surface to leave an outer painted wall of the contrasting color (or colors) and an engraved pattern of the underlying color (or colors). In another embodiment, a second, contrasting color may be sprayed onto a surface having engraved structural features at a non-perpendicular angle to the surface such that only some portions of the surface of the engraved structural elements are covered with the second color while the remaining surface portions retain the first, underlying color.

In an alternative embodiment, a multi-colored surface may be formed through the application and removal of a masking element. More particularly, a masking element may be applied to a surface prior to engraving (and, in some embodiments, after application of a first paint, or paints, to the surface). A laser is then directed onto the masked surface to engrave away portions of the masked surface and the wall underneath, thereby creating a sculpted surface comprising unexposed regions (covered by the masking element) and sculpted regions (uncovered by the masking element). In another embodiment the laser may be adapted to remove only the masking material in targeted location without engraving into the wall of the object itself.

After a pattern has been engraved into the surface a paint or other coloring material can be applied to the sculpted surface (and, more particularly to both the masked and non-engraved surface portions and the engraved and sculpted surface portions), with the paint bonding to and coating the engraved out wall areas but not the surface areas covered by the masking element. Thereafter, the masking element can be removed, leaving a wall surface with a non-engraved portion having a first color and an engraved portion coated by the paint and therefore having a second color. The paint may be applied through spraying, painting, dip coating, or any other appropriate coating method. In one embodiment different colored paints are applied to different regions of the surface, thus creating an object having a multi-colored engraved pattern thereon.

In one embodiment a fluid may be applied to the masking element (and any exposed portion of the surface of the object) prior to, during and/or immediately after the laser engraving process to prevent burning or other damage from the laser to the surface of the object and/or the masking element. More particularly, the fluid may act as a coolant to prevent unwanted burning and/or discoloration of the wall material and/or masking material during and after engraving. The fluid may be applied through spraying, painting, dip coating, or any other appropriate coating method. In one embodiment the fluid is brushed over the surface to ensure a substantially even coating of fluid thereon.

The masking element may include, or consist essentially of a sheet of material (e.g., an adhesive masking tape, a plastic film, a textile sheet, etc.) that is removably adhered to the surface through use of an adhesive or other appropriate adhesion method (e.g., static electricity, vacuum, etc.). Alternatively, the masking element may include, or consist essentially of, a masking liquid or gel (e.g., a low adhesive paint, a mold release liquid, a rubber cement, etc.) that is applied to the surface and that can be removed (e.g., washed off) after engraving. The masking liquid may be applied through spraying, painting, dip coating, or any other appropriate coating method.

Figure 4:
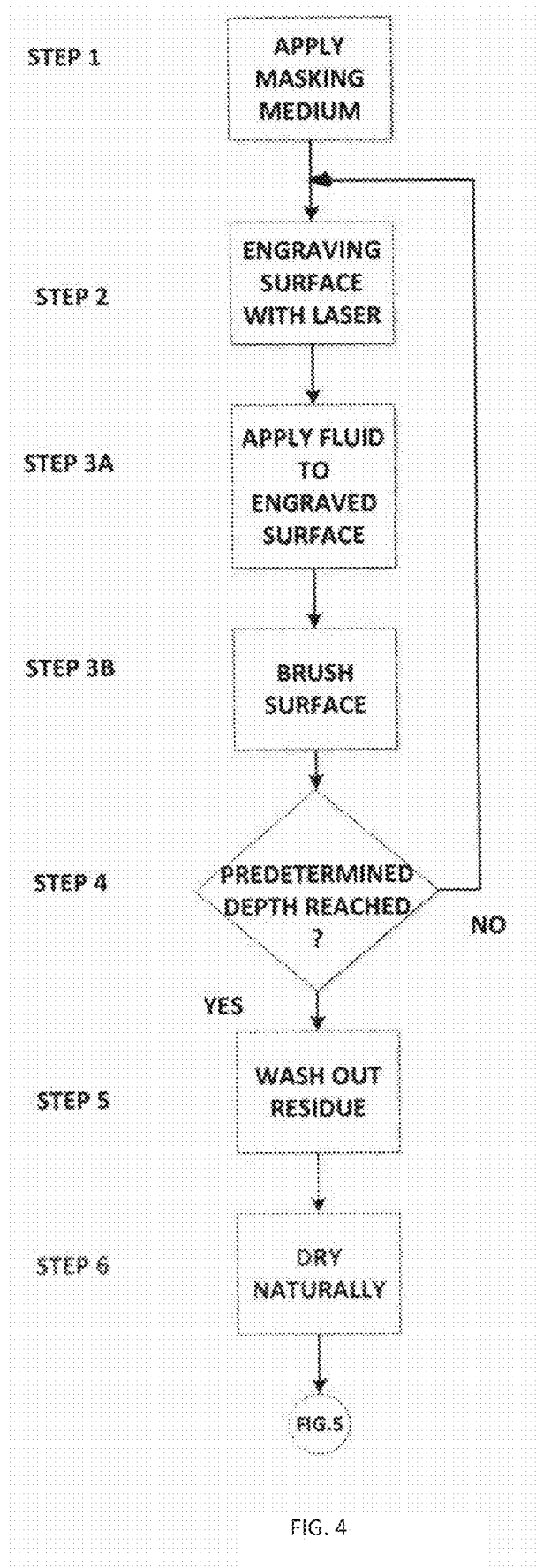
FIG. 4 shows a flow chart for an illustrative embodiment of a method of producing at least one of a decorative design and/or a structural feature on a surface of an article of footwear in accordance with some embodiments of the present invention.
Figure 5:
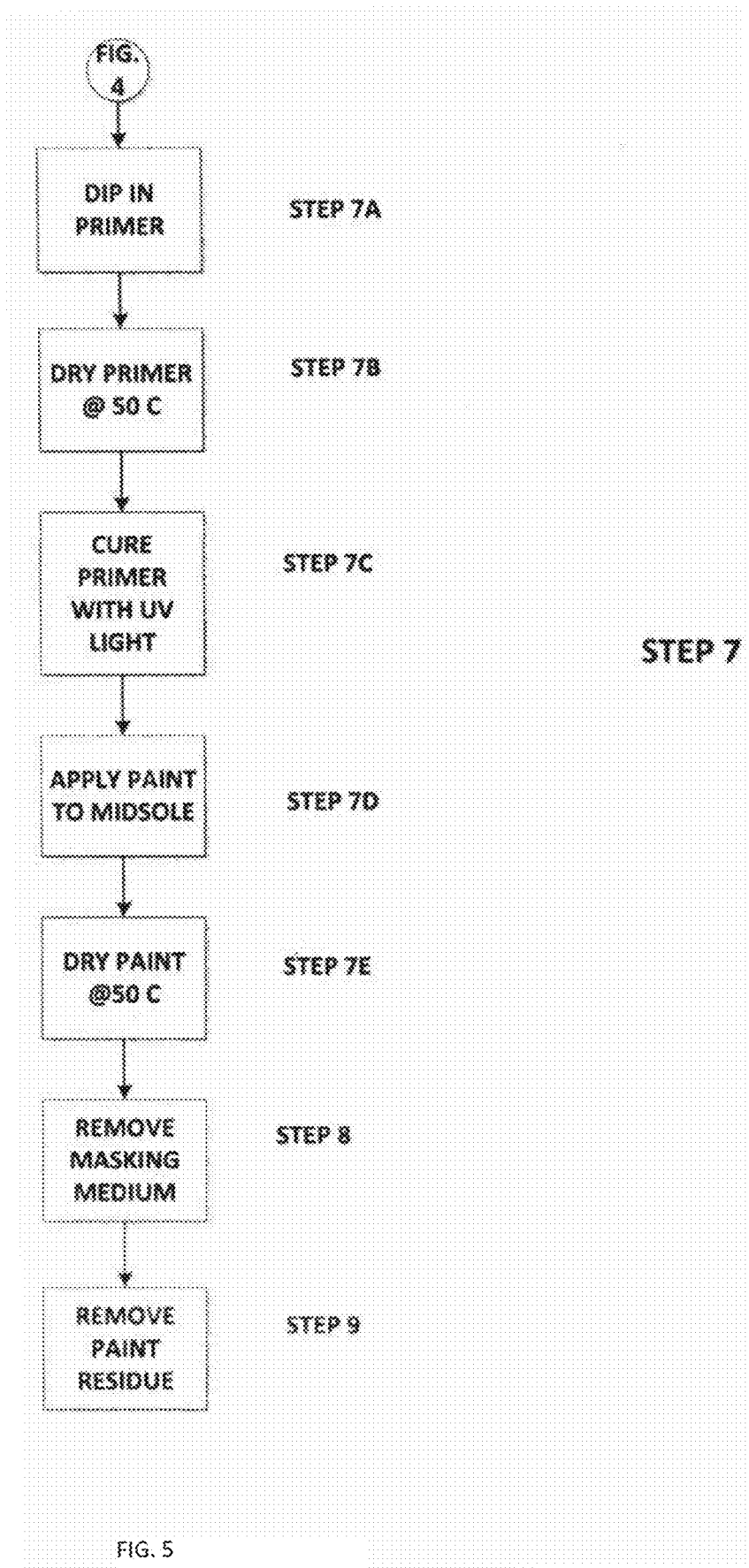
FIG. 5 shows a flow chart for an illustrative embodiment of a method of coloring an aesthetic and/or structural feature that has been engraved into a surface of an object in accordance with some embodiments of the present invention.

An example method of producing a decorative design and/or a structural feature on the surface of an object (e.g., a midsole sidewall, outsole surface, and the like of a shoe) is shown in the flow chart of FIG. 4. The method includes applying a masking medium to the surface of the object to be treated (STEP 1); engraving the surface of the object through the masking medium (STEP 2) in a predetermined pattern (e.g., using a laser); applying a fluid (e.g., a soapy solution) to the engraved surface (STEP 3A) at predetermined intervals during the engraving process, and brushing the surface with the fluid (STEP 3B); and repeating the engraving (STEP 2), applying fluid (STEP 3A), and brushing (STEP 3B) operations until the predetermined pattern having one or more predetermined depth (STEP 4) through the surface has been reached.

For example, in the first step, a masking medium may be applied to the surface of the object (e.g., the sidewall of the midsole), ensuring that there are neither wrinkles nor gaps in the masking medium. In some implementations, the masking material may include a pre-printed pattern to facilitate the engraving process (e.g., by providing a pattern that the laser has to follow during engraving). Alternatively, a pattern image may be projected onto the masking medium. In an automated implementation, the laser may be used with a multi-axis positioning device that is controlled by a suitable controller to generate a pattern (e.g., stored in a data storage medium) to create the desired depressions and cavities in the sidewall, the location, size, shape, and depth of which may be tightly controlled by the laser and the positioning device.

The beam of a light-emitting device (e.g., a $CO_2$ laser) may then be directed to discrete areas and regions on the sidewall of the midsole to cut through the masking material and to selectively engrave midsole material (STEP 2) according to the pattern and to predetermined depths into the sidewall of the midsole. Advantageously, those areas and regions of the sidewall of the midsole that are not engraved remain masked (i.e., covered) by the masking material, which protects these areas and regions from any later applied paint.

Material removal (STEP 2) may continue for a predetermined period of time (which may be from as little as a second, or less, up to a number of minutes, depending upon the size and depth of the engraved element and the material(s) being engraved) and/or until the engraved cavity has reached a predetermined depth into the wall surface (e.g., from between 0.01 mm, or less, up to 15 mm, or even 25 mm, or more).

In one embodiment, at one or more intervals throughout the engraving process, the surface may be treated to cool and/or otherwise protect the masking element and object surface and to remove any waste materials created by the laser engraving process. In one embodiment cooling and protecting the masking element and object surface during lasing (e.g., through the application of liquid) may also, beneficially, provide means for cleaning the debris from the surface. In an alternative embodiment the cooling/protecting step can be separate from the cleaning step.

Cleaning may include, or consist essentially of, blowing (e.g., with compressed air), washing, brushing and/or wiping (e.g., with a cloth). For example, a fluid (e.g., a washing agent such as water) may be applied to the engraved areas and regions (STEP 3A) until the surface is lightly coated in the liquid, after which the wetted area is gently wiped clean (e.g., using a cloth or brush) to remove the debris without damaging the wall surface or the masking material (STEP 3B). After washing, any excess liquid may be removed through blowing (e.g., with compressed air) or any other appropriate method. In some implementations, the washing agent is an aqueous solution containing a surfactant (e.g. a soap), which can, for example, assist in ensuring an even dispersion of liquid over the surface of the object. The washing/cleaning agent may, for example, be an aqueous solution including water and soap, with the percentage of soap ranging from about 0.1% to about 50% and, in one embodiment, between about 0.5% to about 5% and, for example, about 1%.

Subsequent ablation/material removal (STEP 2) and fluid application (STEP 3A) and brushing (STEP 3B) are continued for the corresponding predetermined time and/or predetermined depth until the desired final depth and pattern is reached. Accordingly, the process may include a number of "passes." Advantageously, with each subsequent pass, ablation/material removal (STEP 2) is performed with washing agent adsorbed on the surface of the sidewall and in the concave openings or sockets that were created during a previous pass. As a result, the washing agent further protects the composition material of the midsole proximate the ablation zone from the heat produced by the laser.

Once the structural features and/or desired decorations have been applied to the sidewall of the midsole to their required depths and in their required pattern, the residue from the ablation/material removal on the sidewall of the midsole and within any of the openings or sockets into the sidewall may be removed. This may be achieved through wiping, blowing, and/or washing, and may, in one embodiment, involve washing out the engraved cavities using a liquid (e.g., including, or consisting essentially of, water) and, for example, a jet of liquid (STEP 5). The material may then be left to dry naturally (STEP 6), or may be dried through any appropriate drying process (e.g., heat drying, air drying, etc.). The aesthetics of the midsole may then be enhanced by selectively applying coloration to discrete areas and regions of or on the sidewall of the midsole. Advantageously, in one embodiment the structural features and desired decorations created by STEPS 1-6 may be colored (e.g., by painting) (STEP 7), while the balance of the surface remains masked.

For example, structural features and desired decorations may be painted with one or more colors and/or with a selectively variable color density by any conventional means e.g., via dipping, spraying, brushing, and the like) (STEP 7). In some implementations, painting may begin by priming the sidewall of the midsole with one or more priming agents (e.g., using UV-based primers) (FIG. 7A) by dipping, spraying, brushing, or otherwise coating the sidewall of the midsole with the primer (and, for example, by immersing the object into a primer solution to prime an unmasked portion of the surface of the object). Heat may then be applied to the primed midsole (STEP 7B) to dry the primer before the dry, primed midsole is cured (FIG. 7C). For example, the primed midsole may be dried by heating it for a required drying time (e.g., for certain primers, a drying time of between 2 minutes, or less, to 5 minutes, or more) at an appropriate temperature (e.g., for certain primers, a temperature of between about 40° C. to about 80° C., or more particularly between about 45° C. to about 60° C. and, for example, about 50° Celsius) (STEP 7B). The primed and dried midsole may then be cured/activated by exposure to an illumination source (e.g., using a UV light-emitting device such as a UV lamp) (FIG. 7C) will cure the primer. Paint or another coloring agent may then be applied to the cured, primed midsole (e.g., via dipping, spraying, brushing and the like) (FIG. 7D). Heat may then be applied to the painted midsole (STEP 7E) to dry the paint. For example, the painted midsole may be heated for any appropriate time depending upon the specific paint being used and the specific heating temperature and system utilized and, in one embodiment, for a time of between 2 and 5 minutes at a temperature of about 50° Celsius (about 122° Fahrenheit) (STEP 7E).

After the sidewall of the midsole has been painted (STEP 7D) and the paint has dried (STEP 7E), the remaining masking medium may be removed (STEP 8), leaving a midsole with a clean outer surface, but with colored cavities, which produce interesting and desirable aesthetic effects. Residue paint may then be removed from the colored cavities in any appropriate manner (STEP 9) and, for example, through brushing, wiping, and/or blowing (e.g., through the application of compressed air).

In alternative embodiments any combination of all or some of the above described steps may be utilized, depending upon the specific requirements of the system and materials being utilized and the specific results desired.

In some variations, as described above, the methods described herein may be used in the selective marking/coloring of a surface of the sidewall of the midsole using the light-emitting device without removing material from the surface. This may be carried out with or without the need for application of a masking element. For example, in one embodiment this coloring may take place through a masking material (where the masking element is used to support the color marking). Alternatively, the marking may be carried out without use of any masking element of the surface of the object.

Figure 6:
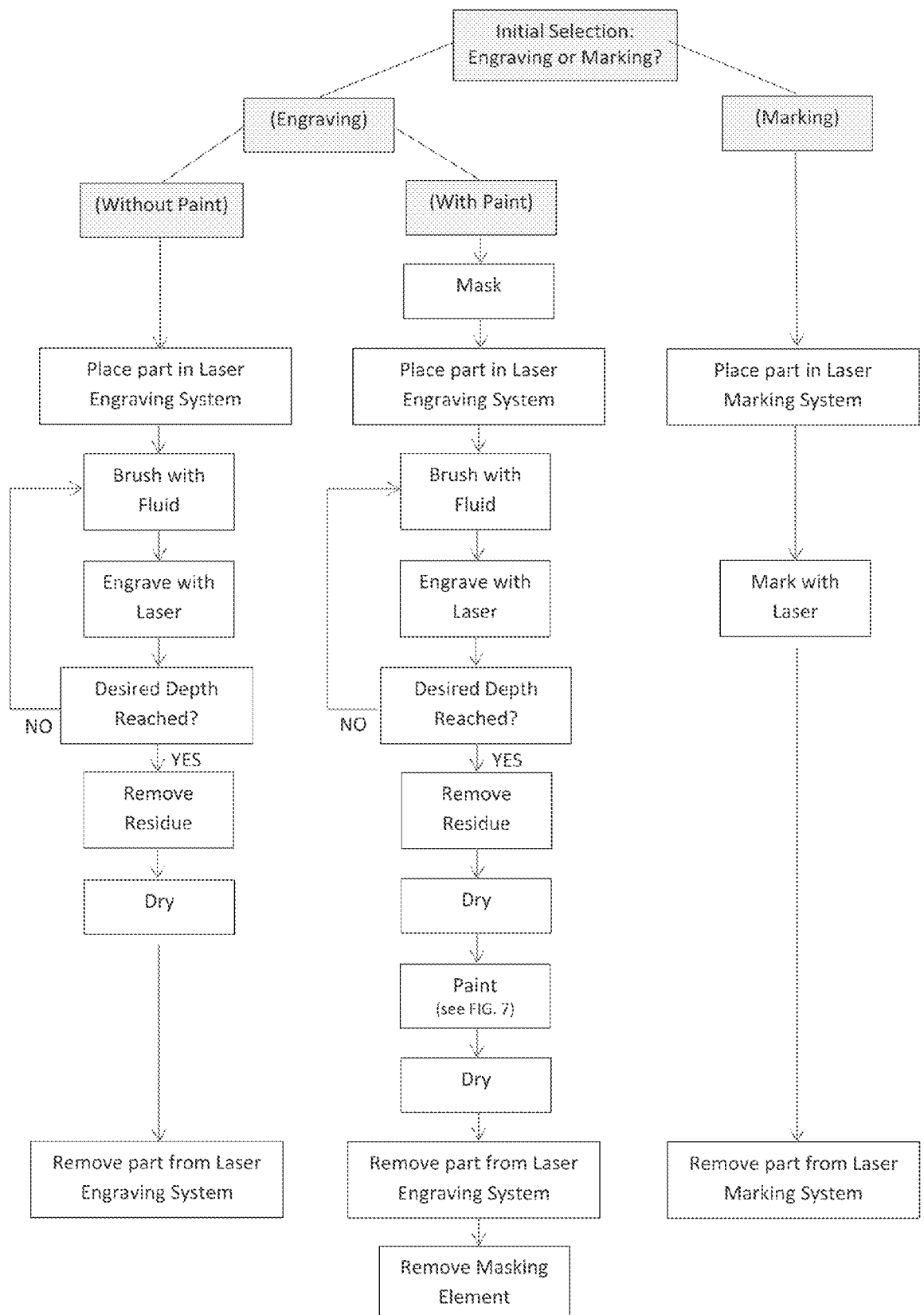
FIG. 6 shows a flow chart for an illustrative embodiment of a method of creating an aesthetic and/or structural feature on a surface of an object in accordance with some embodiments of the present invention.
Figure 7:
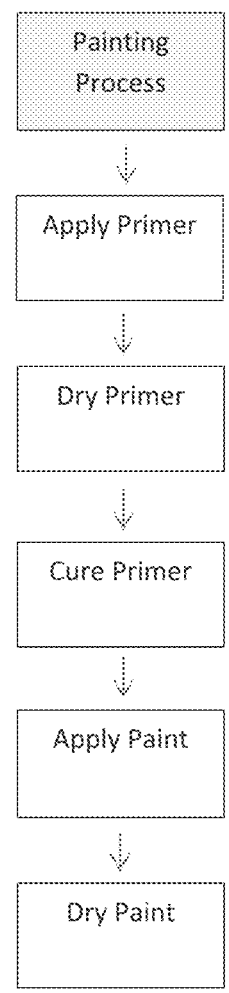
FIG. 7 shows a flow chart for an illustrative embodiment of a method of painting an aesthetic and/or structural feature on a surface of an object in accordance with some embodiments of the present invention.

Another illustrative method of utilizing a laser marking/engraving system to create aesthetic and/or structural patterns on an object is shown in FIGS. 6 and 7. In this embodiment, the method allows for the selection of either marking or engraving systems, and further allows for the engraving to be carried out either with or without painting. An illustrative method of painting the engraved object is shown if FIG. 7.

In one embodiment the object is open to the atmosphere during lasing. In another embodiment the laser marking/engraving system includes an enclosure allowing the object to be held within an inert environment (e.g., in a nitrogen, argon, or other inert gas rich environment) which may be advantageous in reducing yellowing of the material during lasing and to improve the processing time for the marking or engraving process. Alternatively, a flow of nitrogen or another inert gas can be applied to the object (e.g., from a gas jet nozzle), or a portion thereof, during lasing.

It should be understood that materials and process steps used in the construction of embodiments or alternative embodiments, are applicable to other embodiments described herein. It should also be understood that while the embodiments described herein generally relate to the creation of structural and/or aesthetic features on shoes, in certain embodiments the methods and systems described herein may also be used on other appropriate objects. For example, the systems and methods described herein may be utilized to provide structural and/or decorative features to apparel (and, for example, athletic apparel) or to athletic equipment such as, but not limited to, protective equipment or apparel (e.g., helmets, padding, shoulder pads, arm sleeves, knee pads, shin guards, etc.), hockey sticks, lacrosse sticks, tennis racquets, and the like. In one embodiment laser engraving can be used to apply flex grooves in a garment (e.g., by engraving grooves into an upper layer of a multi-layer material) or in a piece of protective apparel being worn by an athlete.

The invention may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:

1. A method of providing a feature on a surface of a sole portion of an article of footwear, the method comprising:

positioning a laser proximate the surface of the sole portion;

directing a laser beam from the laser to the surface of the sole portion to mark or engrave at least a portion of the surface of the sole portion: and moving at least one of the laser and the sole portion to create a pattern comprising a series of distributed structural features comprising at least one of discrete unconnected polyhedronal elements and a conjoined grid of connected polyhedronal elements on the surface of the sole portion, the pattern providing at least one of an aesthetic and a structural feature on the surface of the sole portion, wherein the pattern comprises a first region extending over a first surface portion of the sole portion and a second region extending over a second surface portion of the sole portion, and wherein at least one of a cross-sectional shape, an orientation, a depth, and a density of the structural features differs between the first region and the second region.

2. The method of claim 1, wherein the surface of the sole portion comprises a sidewall of a midsole of the article of footwear.

3. The method of claim 1, wherein the laser comprises at least one of a UV laser and a $CO_2$ laser.

4. The method of claim 1, wherein marking the surface of the sole portion comprises changing color of at least a portion of the surface of the sole portion without removing material therefrom to provide the aesthetic feature on the surface of the object.

5. The method of claim 4, wherein the sole portion comprises at least one of an energy-absorbing color-sensitive additive and a coloring agent to achieve a desired external color on the surface of the sole portion when exposed to the laser.

6. The method of claim 1, further comprising:
applying a masking medium to at least a portion of the surface of the sole portion prior to activation of the laser;
marking or engraving the surface of the sole portion through the masking medium; and
removing the masking medium.

7. The method of claim 1, further comprising applying a fluid to the surface of the sole portion prior to activation of the laser, the fluid acting to support the marking or engraving of the surface of the object.

8. The method of claim 7, further comprising repeating the application of fluid to the surface being marked or engraved during marking or engraving.

9. The method of claim 7, wherein the fluid is an aqueous solution comprising at least one of an additive, a surfactant, and water.

10. The method of claim 1, wherein the sole portion comprises a single, unitary material and wherein engraving the surface of the sole portion comprises removing material therefrom to one or more predetermined depth to provide at least one of the aesthetic and the structural feature on the surface of the sole portion.

11. The method of claim 10, wherein the predetermined depth is between about 0 mm to about 15 mm.

12. The method of claim 10, further comprising:
priming the engraved sole portion;
drying the primed sole portion;
curing the primed sole portion;
applying a coloring agent to at least one engraved portion; and
applying heat to dry the coloring agent on the sole portion.

13. The method of claim 1, wherein the pattern further comprises a transition region between the first region and the second region, wherein at least one of the cross-sectional shape, the orientation, the depth, and the density of the structural features changes gradually within the transition region.

14. The method of claim 1, further comprising removing residue from the surface of the sole portion wherein removing residue comprises:
washing residue created during engraving from the sole portion with an aqueous solution; and
drying the surface of the sole portion.

15. A method of producing an aesthetic feature on a surface of a sole portion of an article of footwear, the method comprising:
positioning a UV laser proximate the surface of the sole portion;
directing a laser beam from the laser to the surface of the sole portion to change a color of at least a portion of the surface of the sole portion without removing material therefrom; and
moving at least one of the laser and the sole portion to create a pattern comprising a series of distributed structural features on the surface of the sole portion, the pattern providing an aesthetic feature on the surface of the sole portion, wherein (i) the distributed structural features comprise at least one of discrete unconnected polyhedronal elements and a conjoined grid of connected polyhedronal elements, (ii) the pattern comprises a first region extending over a first surface portion of the sole portion and a second region extending over a second surface portion of the sole portion, and (iii) at least one of a cross-sectional shape, an orientation, a depth, and a density of the structural features differs between the first region and the second region.

16. A method of providing an aesthetic or a structural feature on a surface of a sole portion of an article of footwear, the method comprising:
applying a masking medium to the surface of the sole portion;
positioning a laser proximate the surface of the sole portion;
directing a laser beam from the laser to the surface of the sole portion to remove material and masking medium therefrom to provide a pattern comprising a series of distributed structural features on at least a portion of the surface of the sole portion, wherein (i) the distributed structural features comprise at least one of discrete unconnected polyhedronal elements and a conjoined grid of connected polyhedronal elements, (ii) the pattern comprises a first region extending over a first surface portion of the sole portion and a second region extending over a second surface portion of the sole portion, and (iii) at least one of a cross-sectional shape, an orientation, a depth, and a density of the structural features differs between the first region and the second region; and
removing the masking medium.

17. The method of claim 16, further comprising applying at least one color to the surface of the sole portion prior to removing the masking medium.

18. The method of claim 17, wherein applying at least one color comprises:
immersing the sole portion into a primer solution to prime an unmasked portion of the surface of the sole portion;
drying the primed sole portion;

curing the primed sole portion;
applying a coloring agent to at least a portion of the unmasked portion of the surface of the sole portion; and
drying the coloring agent on the sole portion.

19. The method of claim 18, wherein the primer solution comprises an ultra-violet primer.

* * * * *